United States Patent
Chaubey et al.

(10) Patent No.: US 11,842,629 B2
(45) Date of Patent: Dec. 12, 2023

(54) DYNAMIC RADAR VECTORING GUIDANCE METHODS AND SYSTEMS

(71) Applicant: HONEYWELL INTERNATIONAL INC., Charlotte, NC (US)

(72) Inventors: Rajesh Chaubey, Bangalore (IN); Roopa Niveditha Sundara Kulal, Bangalore (IN); Ambika Sure, Bangalore (IN); Chethan N, Bangalore (IN); Naresh Bandam, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 495 days.

(21) Appl. No.: 17/159,608

(22) Filed: Jan. 27, 2021

(65) Prior Publication Data
US 2022/0189323 A1 Jun. 16, 2022

(30) Foreign Application Priority Data
Dec. 10, 2020 (IN) .............................. 202011053809

(51) Int. Cl.
*G08G 5/02* (2006.01)
*G08G 5/00* (2006.01)
*G01S 13/91* (2006.01)

(52) U.S. Cl.
CPC ............ *G08G 5/025* (2013.01); *G01S 13/913* (2013.01); *G08G 5/0021* (2013.01)

(58) Field of Classification Search
CPC .... G08G 5/025; G08G 5/0021; G01S 13/913; G01S 13/935
See application file for complete search history.

(56) References Cited

U.S. PATENT DOCUMENTS

| | | | | |
|---|---|---|---|---|
| 6,629,023 B1* | 9/2003 | Silder, Jr. | ............. | G05D 1/0676 340/948 |
| 7,068,187 B2* | 6/2006 | Ishihara | ............... | G05D 1/0676 340/945 |

(Continued)

FOREIGN PATENT DOCUMENTS

CN 109253730 A 1/2019

OTHER PUBLICATIONS

Itoh, Eri, et al., "Feasibility Study on Fixed Flight-Path Angle Descent for Wide-Body Passenger Aircraft," CEAS Aeronautical Journal, Oct. 25, 2018.

*Primary Examiner* — Bhavesh V Amin
(74) *Attorney, Agent, or Firm* — Lorenz & Kopf, LLP

(57) ABSTRACT

Methods and systems are provided for guiding or otherwise assisting energy management of an aircraft radar vectoring en route to a runway. A method involves dynamically determining an updated predicted lateral trajectory for the radar vectoring when the current aircraft status fails to satisfy a trajectory execution criterion for a previously-predicted lateral trajectory by iteratively adjusting a runway interception point defining a segment aligned with the runway until arriving at the updated predicted lateral trajectory for which a stabilization criterion for the runway can be satisfied. The method determines a target value for an energy state parameter of the aircraft at a current location on the updated predicted lateral trajectory and provides indication of a recommended action to reduce a difference between a current value for the energy state parameter and the target value.

20 Claims, 7 Drawing Sheets

(56) References Cited

U.S. PATENT DOCUMENTS

| | | | |
|---|---|---|---|
| 7,132,960 B2* | 11/2006 | Glover | G08G 5/0086 340/972 |
| 7,212,135 B1* | 5/2007 | Lynch | G08G 5/0065 701/16 |
| 7,436,323 B2* | 10/2008 | Ishihara | G01C 23/00 340/951 |
| 7,471,997 B2* | 12/2008 | Tezuka | G05D 1/0684 701/16 |
| 7,647,140 B2 | 1/2010 | Demortier et al. | |
| 7,957,878 B2* | 6/2011 | Rado | B60T 8/1703 701/80 |
| 8,184,020 B2 | 5/2012 | He | |
| 8,412,392 B2* | 4/2013 | Jayathirtha | G05D 1/0005 701/5 |
| 8,436,750 B2* | 5/2013 | Fabre | G08G 5/02 340/963 |
| 8,467,917 B2 | 6/2013 | Botargues et al. | |
| 8,527,173 B2 | 9/2013 | Lacoste et al. | |
| 8,774,989 B1* | 7/2014 | Bush | B64D 43/02 701/16 |
| 8,781,654 B2* | 7/2014 | Giovannini | G08G 5/025 701/4 |
| 8,864,081 B2 | 10/2014 | Constans et al. | |
| 8,892,275 B2 | 11/2014 | Constans et al. | |
| 8,924,047 B2 | 12/2014 | Dewas et al. | |
| 8,948,937 B2 | 2/2015 | Constans et al. | |
| 9,188,978 B2* | 11/2015 | Sacle | G08G 5/003 |
| 9,378,645 B2* | 6/2016 | Berrajaa | G01C 23/00 |
| 9,423,799 B1* | 8/2016 | Wu | G08G 5/0026 |
| 9,536,435 B1 | 1/2017 | Shay | |
| 9,646,503 B2 | 5/2017 | Kawalkar et al. | |
| 9,709,991 B2 | 7/2017 | Bataillon et al. | |
| 9,711,055 B2* | 7/2017 | Vesely | G05D 1/0676 |
| 9,734,724 B2 | 8/2017 | Zammit et al. | |
| 9,815,571 B1 | 11/2017 | Ogden et al. | |
| 10,839,701 B2* | 11/2020 | Moravek | G08G 5/0021 |
| 11,142,337 B2* | 10/2021 | Lax | G08G 5/025 |
| 2006/0200279 A1* | 9/2006 | Ainsworth | G08G 5/025 701/16 |
| 2006/0265110 A1* | 11/2006 | Ferro | G01C 23/00 701/14 |
| 2008/0140272 A1* | 6/2008 | Zadrozynski | G08G 5/0021 701/14 |
| 2008/0262665 A1* | 10/2008 | Coulmeau | G08G 5/0039 701/16 |
| 2008/0312779 A1* | 12/2008 | Sacle | G01C 23/005 701/7 |
| 2009/0043434 A1* | 2/2009 | Deker | G08G 5/025 701/16 |
| 2009/0319105 A1* | 12/2009 | Conner | G08G 5/02 701/16 |
| 2010/0036551 A1* | 2/2010 | Lacaze | G08G 5/025 701/18 |
| 2010/0191394 A1* | 7/2010 | Villaume | G05D 1/0083 701/16 |
| 2010/0286852 A1* | 11/2010 | Bouquet | G05D 1/0676 701/17 |
| 2010/0318244 A1* | 12/2010 | Gomez | G08G 5/025 701/120 |
| 2011/0118908 A1* | 5/2011 | Boorman | G08G 5/0021 701/14 |
| 2011/0166723 A1* | 7/2011 | Valentova | G08G 5/02 701/16 |
| 2013/0204470 A1* | 8/2013 | Luckner | G05D 1/0676 701/18 |
| 2014/0148979 A1* | 5/2014 | De Prins | G05D 1/0676 701/3 |
| 2014/0343764 A1* | 11/2014 | Sacle | B64D 45/04 701/16 |
| 2014/0343765 A1* | 11/2014 | Suiter | G08G 5/0091 701/18 |
| 2014/0343766 A1* | 11/2014 | Le Gall | G05D 1/0676 701/18 |
| 2015/0151849 A1* | 6/2015 | Labastie | B64D 43/02 701/7 |
| 2015/0205302 A1* | 7/2015 | Buisson | G05D 1/0676 701/18 |
| 2016/0063867 A1* | 3/2016 | Zammit | G08G 5/025 701/18 |
| 2016/0085239 A1* | 3/2016 | Boyer | G05D 1/0676 701/5 |
| 2016/0090193 A1 | 3/2016 | He et al. | |
| 2016/0107766 A1* | 4/2016 | He | G01C 23/005 701/16 |
| 2016/0362194 A1* | 12/2016 | Boyer | G05D 1/0005 |
| 2017/0168658 A1* | 6/2017 | Lacko | G01C 23/005 |
| 2017/0243495 A1* | 8/2017 | Moravek | G08G 5/0091 |
| 2017/0358226 A1* | 12/2017 | Hodges | G08G 5/025 |
| 2018/0130363 A1* | 5/2018 | Yvetot | G01C 23/00 |
| 2018/0276999 A1* | 9/2018 | Dacre-Wright | G08G 5/0039 |
| 2018/0370645 A1 | 12/2018 | Durand et al. | |
| 2019/0371187 A1* | 12/2019 | Moravek | B64D 45/04 |
| 2021/0041242 A1 | 2/2021 | Miller | |
| 2022/0189323 A1* | 6/2022 | Chaubey | G01S 13/913 |

* cited by examiner

DYNAMIC RADAR VECTORING GUIDANCE METHODS AND SYSTEMS

PRIORITY

This application claims priority to India provisional application number 202011053809, filed Dec. 10, 2020, the entire content of which is incorporated by reference herein.

TECHNICAL FIELD

The subject matter described herein relates generally to vehicle systems, and more particularly, embodiments of the subject matter relate to aircraft systems capable of facilitating a stable approach to an airport by a radar vectored aircraft by displaying energy management indicia.

BACKGROUND

Often, it is desirable to operate an aircraft in accordance with a stabilized approach when close to the airport (e.g., within a few miles and aligned with the runway) in order to land safely. The stabilized approach is generally defined in terms of a number of specific criteria, which may be set forth by a safety organization, a standards organization or other regulatory body, an airline, an aircraft manufacturer, or the like. Achieving a stabilized approach can be a challenging task, especially in certain circumstances such as adverse weather conditions, on-board malfunctions, low quality of air traffic control (ATC), bad crew cooperation, fatigue, visual illusions, inexperienced crew members, and the like. Modern autopilot and/or flight management systems often leverage defined approach procedures to facilitate a stable approach.

However, in some instances, radar vectoring is utilized by ATC to manage traffic flow by instructing aircraft to deviate from predefined routes or procedures, for example, to achieve desired separation distances, aircraft sequencing, resolve potential conflicts between aircraft, and/or the like. Once the aircraft deviates from a predefined route or procedure using the assigned heading or vector provided by ATC, a pilot may lose situational awareness with respect to the energy state of the aircraft. For example, the pilot may lack awareness with respect to the upcoming lateral trajectory at which the aircraft will be vectored by the ATC, and thus, the pilot may also lack awareness of how the energy state of the aircraft should be managed while being vectored by ATC. Accordingly, it desirable to provide energy management guidance for radar vectored aircraft to improve situational awareness and facilitate stable approaches.

BRIEF SUMMARY

Methods and systems are provided for assisting energy management of an aircraft. One exemplary method involves identifying interception criteria for approaching a runway at an airport, determining a lateral trajectory in accordance with the interception criteria based at least in part on a current heading and a current location of the aircraft, wherein the lateral trajectory comprises a sequence of segments for satisfying the interception criteria from the current location of the aircraft and each navigational segment of the sequence is associated with an anticipated aircraft heading and a respective distance for the respective navigational segment, determining a reference vertical trajectory corresponding to the lateral trajectory using one or more criteria associated with the runway, determining a target value for an energy state parameter of the aircraft at the current location on the lateral trajectory using the reference vertical trajectory, and providing a graphical indication of a recommended action to reduce a difference between a current value for the energy state parameter of the aircraft and the target value.

In another embodiment, a method of assisting energy management of an aircraft radar vectoring en route to an airport involves obtaining, from one or more systems onboard the aircraft, a current aircraft location and a current aircraft heading, identifying interception criteria for alignment with a runway at the airport, determining a predicted lateral trajectory in accordance with the interception criteria based at least in part on the current aircraft heading and the current aircraft location, wherein the predicted lateral trajectory comprises a sequence of segments for satisfying the interception criteria from the current aircraft location and each segment of the sequence is associated with a respective aircraft heading predicted to be assigned to the aircraft, obtaining one or more energy management criteria associated with the runway, constructing a reference vertical trajectory corresponding to the predicted lateral trajectory that satisfies the one or more energy management criteria associated with the runway, determining a target value for an energy state parameter of the aircraft at the current aircraft location on the predicted lateral trajectory according to the reference vertical trajectory, and providing, on a display device onboard the aircraft, one or more graphical indicia influenced by a difference between a current value for the energy state parameter of the aircraft and the target value.

An embodiment of an aircraft system is also provided. The aircraft system includes a display device, a data storage element to maintain interception criteria, a navigation system to provide a current location of an aircraft and a current heading of the aircraft, and a processing system coupled to the display device, the data storage element and the navigation system to determine a lateral trajectory between the current location and a runway in accordance with the interception criteria based at least in part on the current heading and the current location of the aircraft, determine a reference vertical trajectory corresponding to the lateral trajectory using one or more criteria associated with the runway, determine a target value for an energy state parameter of the aircraft at the current location on the lateral trajectory using the reference vertical trajectory, and provide, on the display device, a graphical indication influenced by a difference between a current value for the energy state parameter of the aircraft and the target value.

In one embodiment, a method of assisting energy management of an aircraft en route to an airport involves identifying a stabilization criterion associated with approaching a runway at the airport, iteratively determining a lateral vectoring trajectory and a vertical trajectory corresponding to the lateral vectoring trajectory that satisfies the stabilization criterion based at least in part on a current heading and a current location of the aircraft by iteratively adjusting a distance between a runway interception point and a final approach fix associated with the runway until satisfying the stabilization criterion, determining a target value for an energy state parameter of the aircraft at the current location on the lateral vectoring trajectory using the vertical trajectory, and providing a graphical indication of a recommended action to reduce a difference between a current value for the energy state parameter of the aircraft and the target value.

In another embodiment, an apparatus for a non-transitory computer-readable medium is provided. The computer-readable medium is capable of storing computer-executable instructions that, when executed by a processing system, cause the processing system to obtain, from one or more systems onboard an aircraft, a current status of the aircraft and compare the current status of the aircraft to a predicted lateral vectoring trajectory for the aircraft and a reference vertical trajectory for the predicted lateral vectoring trajectory. When the current status of the aircraft violates a trajectory execution criterion with respect to the predicted lateral vectoring trajectory, the instructions cause the processing system to dynamically determine an updated lateral vectoring trajectory and an updated reference vertical trajectory corresponding to the updated lateral vectoring trajectory that satisfies a stabilization criterion based at least in part on the current status of the aircraft, wherein the updated lateral vectoring trajectory comprises a sequence of segments from a current location of the aircraft to an airport, each navigational segment of the sequence is associated with an anticipated aircraft heading and a respective distance for the respective navigational segment, the sequence of segments includes a segment aligned with a runway at the airport from a runway interception point to a final approach fix associated with the runway, and dynamically determining the updated lateral vectoring trajectory comprises iteratively adjusting a distance between the runway interception point and the final approach fix until the current status is capable of satisfying the stabilization criterion associated with the updated reference vertical trajectory. The instructions further cause the processing system to determine a target value for an energy state parameter of the aircraft at the current location on the updated lateral vectoring trajectory using the updated reference vertical trajectory and provide a graphical indication of a recommended action to reduce a difference between a current value for the energy state parameter of the aircraft and the target value.

In another embodiment, an aircraft system is provided. The aircraft system includes a display device, a data storage element to maintain interception criteria, a navigation system to provide a current location of an aircraft and a current heading of the aircraft, and a processing system coupled to the display device, the data storage element and the navigation system to determine a lateral trajectory to a runway in accordance with the interception criteria based at least in part on the current heading, identify when a current aircraft status violates a trajectory execution criterion for the lateral trajectory, when the current aircraft status violates the trajectory execution criterion, dynamically determine an updated lateral trajectory to the runway for satisfying the trajectory execution criterion using the interception criteria based at least in part on the current heading and the current location of the aircraft by iteratively adjusting a runway interception point until satisfying the trajectory execution criterion, determine a vertical trajectory corresponding to the updated lateral trajectory using one or more criteria associated with the runway, determine a target value for an energy state parameter of the aircraft at the current location on the updated lateral trajectory, and provide, on the display device, a graphical indication influenced by a difference between a current value for the energy state parameter of the aircraft and the target value.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
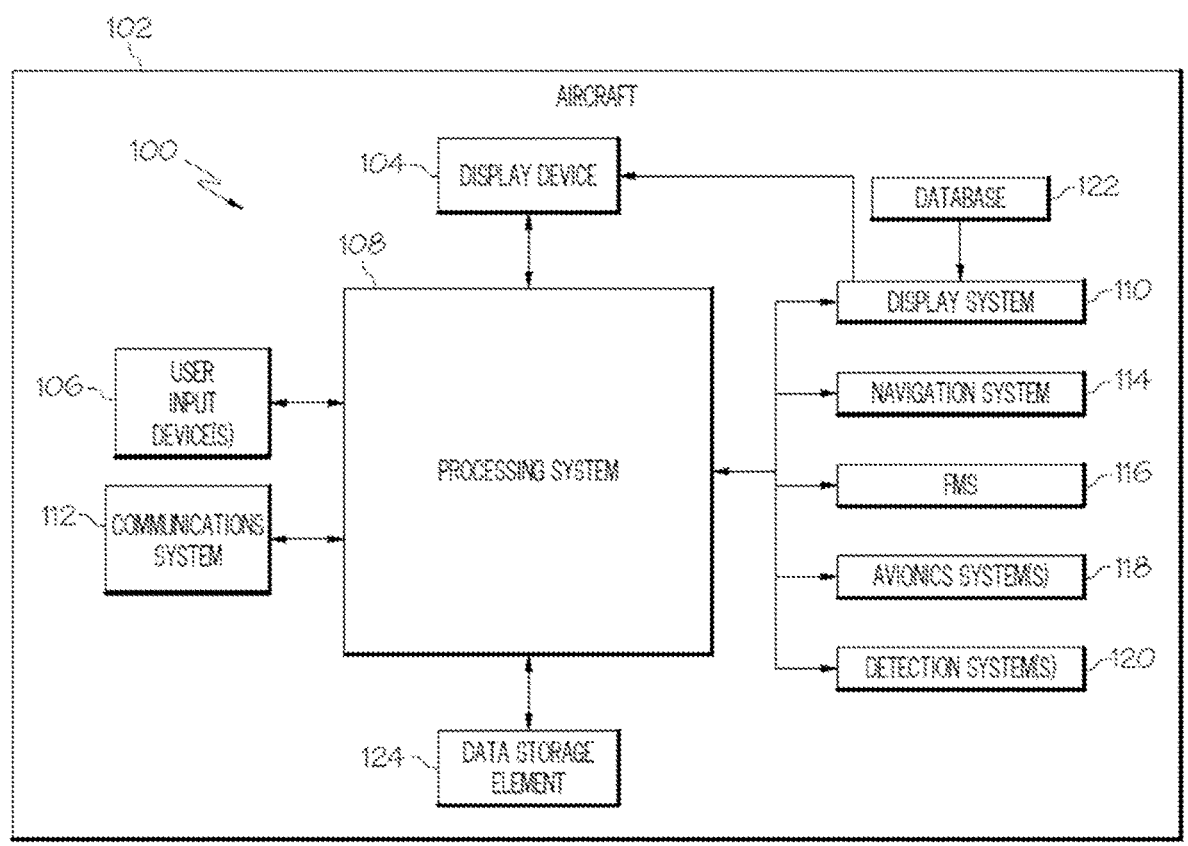
FIG. 1 is a block diagram of a system for an aircraft in an exemplary embodiment.

Embodiments of the subject matter described herein generally relate to systems and methods for managing energy of a vehicle en route to a destination. While the subject matter described herein could be utilized in various applications or in the context of various types of vehicles (e.g., automobiles, marine vessels, trains, or the like), exemplary embodiments are described herein in the context of an aircraft that is en route to an airport along a heading assigned by air traffic control (ATC), for example, in accordance with radar vectoring or other traffic management procedures or protocols.

As described in greater detail below primarily in the context of FIGS. 2-5, an anticipated lateral vectoring trajectory for approaching the runway from the current location of the aircraft given the currently assigned heading is determined in accordance with one or more runway interception criteria. The runway interception criteria may include, for example, a distance for defining a merge point (or approach gate) along the final approach course relative to a final approach fix (FAF), a desired angle for intercepting or approaching the merge point, and/or the like. The resulting lateral vectoring trajectory represents the predicted or anticipated vectoring trajectory to be provided by the ATC assigning or otherwise providing sequences of headings or turns at appropriate locations or distances to complete the route from the current location of the aircraft to the FAF. In exemplary embodiments, the lateral vectoring trajectory includes a sequence of navigational segments having associated headings, distances, and anticipated heading transition points (or turns) that define a route from the current location and heading of the aircraft to a final alignment with the runway in accordance with the interception criteria (e.g., intercepting the merge point at the desired angle) and represents a predicted or anticipated sequence of headings and turns that are expected to be assigned by the ATC in the future and the corresponding transition points or distances (or duration of flight) between assignments.

Based on the predicted lateral vectoring trajectory, a corresponding reference vertical trajectory for that predicted lateral vectoring trajectory is determined using one or more energy management criteria associated with the runway, such as, for example, any existing or applicable minimum and/or maximum altitude constraints associated with the final approach fix for the runway, any existing or applicable minimum and/or maximum airspeed constraints associated with the final approach fix, any existing or applicable minimum and/or maximum descent rate associated with the final approach fix, and/or the like. In this regard, various embodiments may include any number or type of energy management criteria, such as one or more of the stabilization criteria described in U.S. Patent Publication No. 2013/0218374, including, but not limited to, a desired target speed or a desired range of speeds upon reaching a stabilization target point, a threshold descent rate upon reaching a stabilization target point, a particular aircraft configuration upon reaching a stabilization target point, a particular aircraft power setting upon reaching a stabilization target point, etc. For example, the reference vertical trajectory may include a sequence of one or more flight levels or altitude levels, airspeed values, descent rates (or descent speeds) and/or aircraft configurations that define a vertical profile or flight path backwards from the final approach fix to the current location of the aircraft along the lateral vectoring trajectory. In this regard, the reference vertical trajectory represents the recommended altitudes and speeds for the aircraft to observe while flying the predicted lateral vectoring trajectory to facilitate a stable approach and/or landing.

Once a predicted lateral vectoring trajectory and corresponding reference vertical trajectory are determined, a target value may be calculated or otherwise determined for one or more energy state parameters of the aircraft at the aircraft's current location along the lateral vectoring trajectory using the reference vertical trajectory. In this regard, based on the reference vertical trajectory, a target altitude value and/or a target airspeed value may be determined as the altitude and/or airspeed specified by the reference vertical trajectory at the aircraft's current distance from the runway (or FAF) along the reference vertical trajectory. By virtue of the reference vertical trajectory being constructed in accordance with energy management criteria associated with the runway, the target energy state parameter value represents a value for a respective energy state parameter at the current location of the aircraft that is likely to result in the aircraft satisfying one or more downstream criteria for that energy state parameter (e.g., a minimum and/or maximum value for that energy state parameter at the FAF), that is, the target value is aligned with the expected speed and altitude to be followed for a stable approach and landing at a given aircraft location on the predicted lateral vectoring trajectory according to the reference vertical trajectory. Based on a difference or deviation between the current or real-time value for an energy state parameter and the target value dictated by the reference vertical trajectory, one or more remedial actions for reducing the difference may be determined and a corresponding graphical indicia of such recommended action(s) may be provided (e.g., on a display device or via another user interface onboard the aircraft). In this manner, the pilot of a radar vectored aircraft is provided with guidance for how to manage the current energy state of the aircraft while traveling along an assigned heading.

In one or more exemplary embodiments, the predicted lateral vectoring trajectory, the reference vertical trajectory, and target energy state parameter values are dynamically determined as the aircraft travels to account for deviations in the ATC heading assignments relative to what was initially predicted or expected. For example, if the ATC instructs the aircraft to change headings earlier or later than originally anticipated or otherwise assigns a different subsequent heading than previously predicted, the predicted lateral vectoring trajectory and the reference vertical trajectory may be dynamically updated to reflect the current situation of the aircraft. The energy management guidance may then be correspondingly updated to facilitate energy management in accordance with the updated lateral vectoring trajectory.

Aircraft System Overview

Referring now to FIG. 1, an exemplary embodiment of a system 100 which may be located onboard a vehicle, such as an aircraft 102, includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in some embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., airline or operator preferences, etc.) along with information pertaining to the pilot and/or co-pilot of the aircraft (e.g., pilot preferences, experience level, licensure or other qualifications, etc.).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historic meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Energy Management Guidance for Radar Vectored Aircraft

Figure 2:
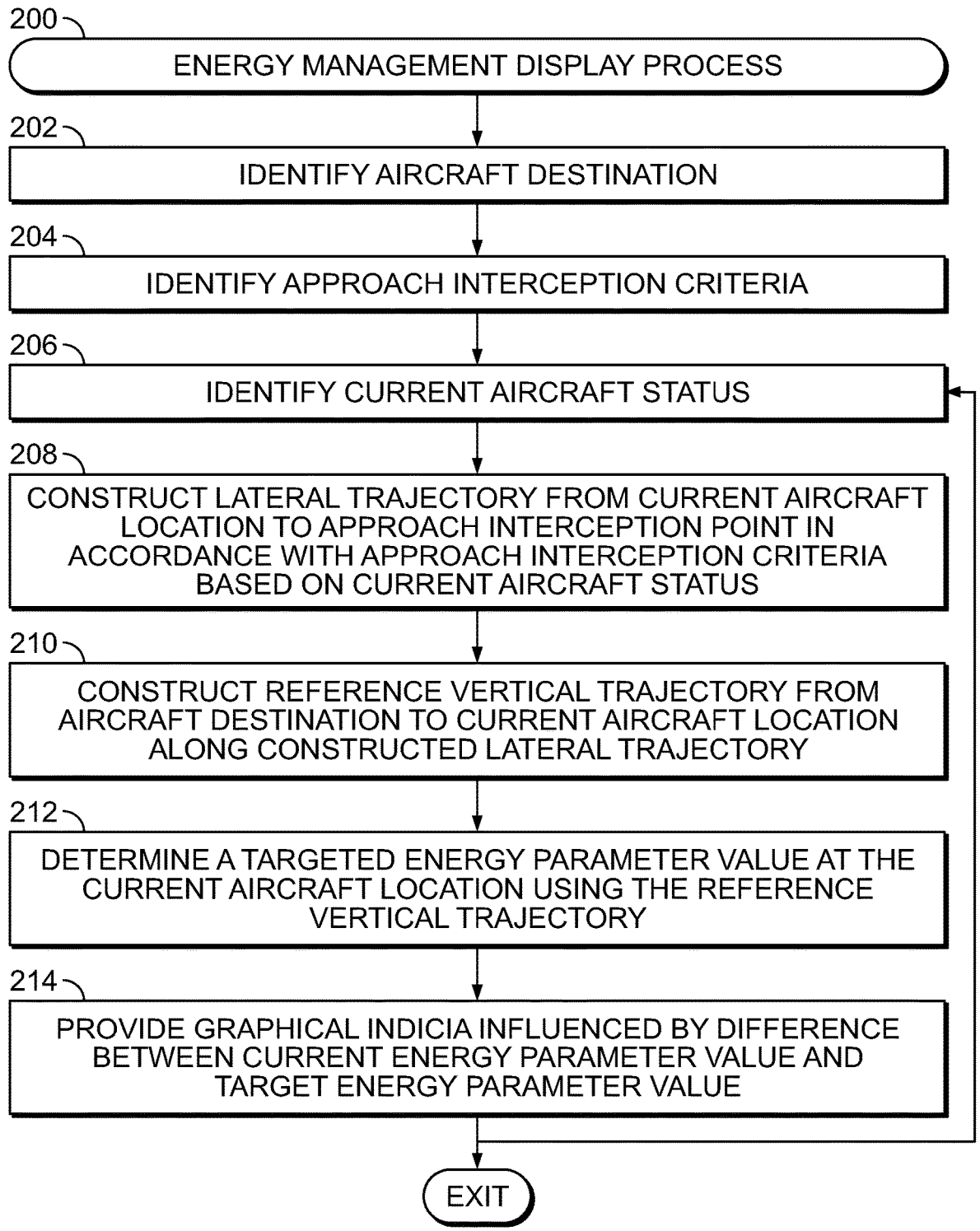
FIG. 2 is a flow diagram of an exemplary energy management display process suitable for use with the aircraft in the system of FIG. 1 in accordance with one or more embodiments.

Referring now to FIG. 2, in an exemplary embodiment, the aircraft system 100 is configured to support an energy management display process 200 to display, present, or otherwise provide graphical indicia facilitating execution of a stable approach and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the energy management display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the energy management display process 200 may include any number of additional or alternative tasks, the tasks need not be performed in the illustrated order and/or the tasks may be performed concurrently, and/or the energy management display process 200 may be incorporated into a more comprehensive procedure or process having additional functionality not described in detail herein. Moreover, one or more of the tasks shown and described in the context of FIG. 2 could be omitted from a practical embodiment of the energy management display process 200 as long as the intended overall functionality remains intact.

Referring to FIG. 2 with continued reference to FIG. 1, the illustrated energy management display process 200 initializes or otherwise begins by identifying the current destination for the aircraft (task 202). For example, based on the flight plan maintained by the FMS 116 or in an onboard data storage element 124, the processing system 108 may identify the destination airport for the aircraft and the runway the aircraft is intended to land on at the destination airport. In some embodiments, the energy management display process 200 may also identify the approach procedure associated with the destination runway that has been selected for the aircraft. In this regard, the approach procedure may identify or otherwise include navigational reference points (or waypoints) that define the route to be flown en route to the airport for landing at the desired runway.

Additionally, in some embodiments, the approach procedure may define altitude criteria associated with one or more of the navigational reference points that may constrain the approach flight path (e.g., altitude minima or maxima). Accordingly, based on the selected runway at the destination airport and/or the selected approach procedure for the runway, the processing system 108 may identify or otherwise determine the geographic location of the runway, the heading or orientation of the runway, and a final approach fix or final approach point for the runway. In this regard, the final approach fix may be realized as one of the navigational reference points that defines the final segment of the selected approach procedure, that is, the navigational reference point closest to the runway.

The energy management display process 200 also identifies or otherwise determines one or more interception criteria for intercepting the final approach course or heading for the selected runway (task 204). In this regard, the interception criteria define the location and heading (or angle), projected from the interception point towards the current heading of the aircraft, at which it is anticipated the aircraft will engage the final approach course aligned with the runway before reaching the final approach fix. In exemplary embodiments, the interception criteria include an interception distance criterion defining a distance in advance of the final approach fix that defines the location of an interception point (or merge point) where the aircraft is expected to achieve alignment with the runway heading. In this regard, the interception point or merge point corresponds to the imaginary point (or approach gate) expected to be utilized by ATC when vectoring aircraft to the final approach course, which is located the specified interception distance from the final approach fix along the runway heading on the side of the final approach fix opposite the runway. The interception criteria also include an interception angle that defines the anticipated heading or angle of the final vectored segment en route to the interception point. In some embodiments, the interception criteria may be user-defined or otherwise configurable by a pilot or other user. For example, based on the pilot's knowledge or familiarity with a particular airport, the pilot may input or otherwise provide values for the interception distance and angle that reflect the pilot's previous operation at that airport. In other embodiments, the interception distance and angle may be fixed or otherwise set at predefined values defined by a standards organization or other regulatory body, an airline, an aircraft manufacturer, or the like. For example, by default, the interception distance may be set to one nautical mile in advance of the FAF and the interception angle may be set to 30° relative to the runway heading.

Still referring to FIG. 2, the energy management display process 200 continues by identifying or otherwise obtaining current status information pertaining to the aircraft (task 206). For example, the processing system 108 may obtain (e.g., from FMS 116, navigation system 114 and/or other avionic systems 118) the current location of the aircraft 102, the current altitude (or above ground level) of the aircraft 102, the current heading (or bearing) of the aircraft 102, the current amount of fuel remaining onboard the aircraft 102, the current engine status, the current aircraft configuration (e.g., the current flap configuration), and/or other instantaneous, real-time or recent values for one or more parameters that quantify the current operation of the aircraft 102. The processing system 108 may also identify or determine one or more current aircraft energy state parameter values using the current aircraft status information obtained from the onboard system(s) 114, 116, 118, such as, for example, the current aircraft speed value, the current aircraft altitude value, the current aircraft drag configuration, and/or the like. In some embodiments, the processing system 108 may calculate or otherwise determine an energy metric as a function of one or more current parameter values. For example, a total energy associated with the aircraft may be calculated as a function of the current aircraft speed, current aircraft altitude, and the current aircraft weight, which may be calculated or estimated based on the current amount of fuel remaining.

After identifying the current location and currently assigned heading for the aircraft, the energy management display process 200 constructs or otherwise generates a lateral vectoring trajectory for the aircraft from the current aircraft location and heading to the interception point of the runway in accordance with the interception criteria (task 208). In this regard, the lateral vectoring trajectory includes an initial segment aligned with the current aircraft heading, a final segment aligned with the runway heading, an interception segment aligned with the interception angle or heading relative to the final segment, and one or more additional intermediate segments between the initial segment and the interception segment. For example, the interception segment may be projected from the interception point along the interception angle or heading relative to the final segment towards the initial segment until intersecting the initial segment. Depending on the embodiment, based on the resulting angle between the interception segment and the initial segment, one or more intermediate segments may be constructed between the initial segment and the interception segment. In this regard, the intermediate segments account for the turning radius of the aircraft 102 to provide a feasible lateral vectoring trajectory that the aircraft 102 is capable of flying given the aircraft's current airspeed, the current aircraft configuration, and potentially other factors (e.g., meteorological conditions or the like). In practice, any number of rules or criteria may be defined that dictate the number and manner of constructing intermediate segments. For example, in one embodiment, the intermediate segments are required to have a minimum distance of one nautical mile and a maximum angle between headings of successive segments of 90°. For example, when the aircraft is flying towards the runway axis, the interception segment may be sufficient to establish a route to the interception point, in which case further intermediate segments may be unnecessary. However, when the aircraft is flying away from or parallel to the runway axis, one or more intermediate segments may be required to complete the route to the interception segment having the desired interception angle with respect to the runway.

Figure 3:
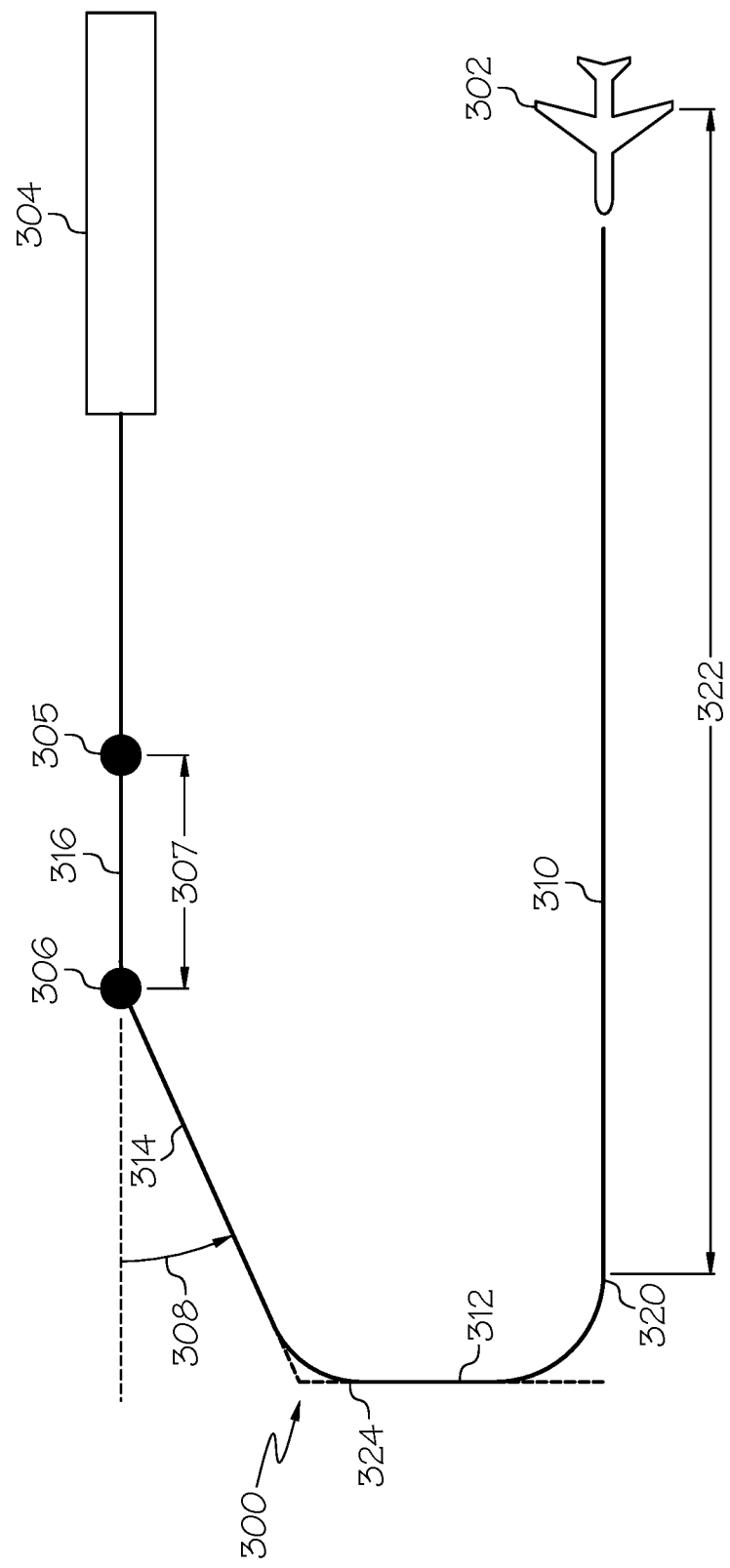
FIG. 3 depicts an exemplary predicted lateral trajectory that may be constructed in connection with the energy management display process of FIG. 2 in accordance with one or more embodiments.

FIG. 3 depicts an exemplary lateral vectoring trajectory 300 that may be constructed in accordance with the energy management display process 200 for radar vectoring from a current location of an aircraft 302 to a desired runway 304. In this regard, the lateral vectoring trajectory 300 intersects or intercepts the runway heading at an interception point 306 in advance of the FAF 305 for the runway by an interception distance criterion 307 at the desired interception angle 308 relative to the runway heading. To construct the lateral vectoring trajectory 300, an initial segment 310 aligned with the currently assigned aircraft heading is defined by projecting from the current aircraft location 302 along the assigned heading, and a final segment 316 aligned with the runway 304 and FAF 305 is defined between the interception point 306 and the runway 304. An interception segment 314 is projected from the interception point 306 at the interception angle 308 relative to the runway heading towards the projection of the initial segment 310. In this regard, when the angle between the heading associated with the initial segment 310 and the heading associated with the interception segment 314 is greater than 90°, an intermediate segment 312 is defined between the segments 310, 314 such that the angle between any two successive segments is less than or equal to 90°. In exemplary embodiments, after defining the heading for the intermediate segment 312, a transition point 320 for where the aircraft is expected to be vectored from the currently assigned heading to the intermediate segment heading is calculated or otherwise determined based on the current or anticipated aircraft speed. For example, the radius of a quarter turn (or) 90° arc between segments 310, 312 may be calculated or otherwise determined by multiplying the airspeed by a factor of 0.5%. In a similar manner, a second transition point 324 may be calculated or otherwise determined from the intermediate segment 312 to the interception segment 314 based on the expected airspeed along the intermediate segment 312. In one or more embodiments, the lengths of the segments 310, 312, 314 and the locations of the transition points 320, 324 are iteratively adjusted or determined to ensure the resulting lateral vectoring trajectory 300 complies with applicable route construction rules (e.g., minimum and/or maximum segment distances, minimum and/or maximum angles between successive segments, and/or the like). The resulting distance 322 between the transition point 320 and the current aircraft location 302 represents the expected distance or duration that the aircraft is expected to fly on the currently assigned heading until being vectored by the ATC to the heading associated with the intermediate segment 312.

Referring again to FIG. 2, in exemplary embodiments, after constructing a lateral vectoring trajectory in accordance with the interception criteria, the energy management display process 200 continues by constructing or otherwise generating a reference vertical trajectory corresponding to the constructed lateral vectoring trajectory (task 210). In exemplary embodiments, the energy management display process 200 retrieves or otherwise obtains one or more altitude, airspeed, or other criteria associated with the final approach fix for the runway and then calculates the reference vertical trajectory backwards from the runway in a manner that complies with the applicable criteria. For example, based on the selected approach procedure for the runway that was previously configured for the flight plan, the processing system 108 may obtain any minimum and/or maximum altitude criteria associated with the final approach fix, any minimum and/or maximum airspeed criteria associated with the final approach fix, any minimum and/or maximum descent rate criteria associated with the final approach fix, any required aircraft configuration at the final approach fix, and/or the like. The processing system 108 may also analyze the procedure information associated with the runway to identify a glideslope angle associated with the runway, and/or other parameters or criteria associated with the runway for defining the approach flight path for landing at the runway. The energy management display process 200 then constructs a vertical profile or flight path between the current altitude of the aircraft and the runway that complies with the various criteria associated with the runway, the final approach fix, or other stabilization points or navigational reference points expected to be traversed en route to the runway. In exemplary embodiments, the energy management display process 200 also identifies or otherwise determines one or more descent criteria for approaching the runway. For example, the energy management display process 200 may identify a desired flight path angle for descending to the airport, a desired descent rate, a desired thrust configuration for descent (e.g., idle descent), desired flap extension points or other aircraft configuration change points relative to the airport, and/or the like. In various embodiments, the energy management display process 200 also identifies or otherwise obtains forecasted or real-time meteorological information associated with the runway (e.g., via communications system 112), the current location of the aircraft (e.g., via an onboard detection system 120), or other navigational reference points or geographic areas relevant to the lateral vectoring trajectory so that the resulting reference vertical trajectory accounts for meteorological impacts on the descent of the aircraft 102 (e.g., wind speed and direction, etc.).

Figure 4:
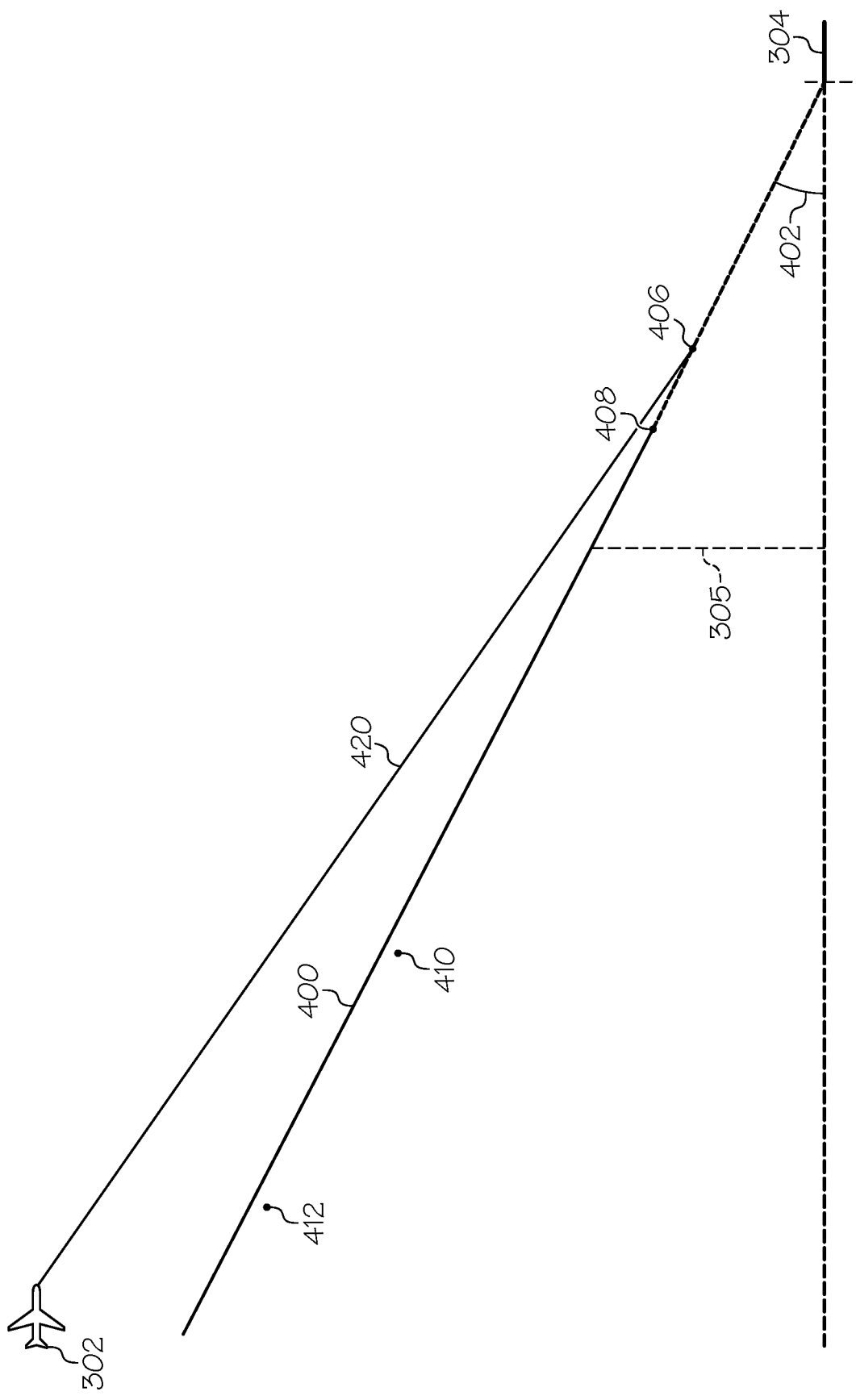
FIG. 4 depicts an exemplary vertical trajectory corresponding to a predicted lateral trajectory that may be constructed in connection with the energy management display process of FIG. 2 in accordance with one or more embodiments.

FIG. 4 depicts an exemplary reference vertical trajectory 400 that may be constructed in accordance with the energy management display process 200 for radar vectoring from a current location of an aircraft 302 to a desired runway 304. For example, the reference vertical trajectory 400 may be constructed backwards from the runway 304 with a reference flight path angle 402 corresponding to the angle of the glideslope associated with the runway 304 for the duration of the final segment 316 to be flown in alignment with the runway 304. The reference vertical trajectory 400 also complies with any applicable altitude, speed, and/or aircraft configuration constraints associated with the FAF 305 at the corresponding location within the reference vertical trajectory 400. The energy management display process 200 may then utilize the descent criteria (e.g., descent rate, flight path angle, thrust configuration, and/or the like) to continue constructing the reference vertical trajectory 400 backwards along the lateral vectoring trajectory 300 until reaching the current location of the aircraft 302. In this regard, depending on the current energy state for the aircraft, the reference vertical trajectory 400 may provide a different altitude, airspeed, aircraft configuration, and/or the like at the current location of the aircraft 302 relative to the current altitude, airspeed, aircraft configuration, and/or the like.

For example, FIG. 4 depicts the reference vertical trajectory 400 constructed backwards from the runway 304 with a fixed flight path angle 402 that satisfies a 1000 foot above ground level (AGL) approach stabilization altitude criterion 406 for maintaining a constant approach speed, the 1500 ft AGL altitude criterion 408 for checking altitude and airspeed for compliance with the 1000 ft AGL criterion 408, the descent speed limit altitude restriction 410, the Mach to calibrated airspeed (CAS) crossover altitude 412, and the like. The reference vertical trajectory 400 also satisfies applicable altitude, airspeed, and/or descent rate criteria associated with the FAF 305, and potentially other navigational reference points associated with a given approach procedure that are traversed by the corresponding lateral trajectory. Based on the current aircraft altitude and airspeed at the current aircraft location, in exemplary embodiments, the energy management display process 200 calculates or otherwise determines a recommended vertical trajectory 420 for intercepting the reference vertical trajectory 400 at or before the applicable altitude criterion or constraint closest to the airport 304 (e.g., the 1000 ft AGL stabilization altitude). For example, the energy management display process 200 may identify or otherwise determine a recommended vertical trajectory 420 having a constant descent flight path angle backwards from the location of the 1000 ft AGL stabilization altitude 406, and then based on the current aircraft altitude and airspeed, identify or otherwise determine one or more sequences of aircraft configuration changes (e.g., flap extension locations and extension positions, locations or distances for engaging the airbrake, and/or the like) to reduce the energy of the aircraft to satisfy the constant approach speed at the location of the 1000 ft AGL stabilization altitude 406.

Still referring to FIG. 2, in one or more embodiments, the lateral vectoring trajectory and reference vertical trajectory may be iteratively determined such that the transitions between segments of the lateral vectoring trajectory reflect the anticipated airspeed and/or aircraft configuration dictated by the reference vertical trajectory, such that the resulting lateral vectoring trajectory reflects the expected radar vectoring to be provided by the ATC for a stable approach that complies with the various altitude, airspeed, and/or other stabilization or energy management criteria for the approach to the desired runway. In this regard, the airspeeds specified by the reference vertical trajectory at different locations within the lateral vectoring trajectory influence the anticipated turning radius of the aircraft at those locations, which, in turn, influences the determination of the lateral vectoring trajectory, which, in turn, may influence the reference vertical trajectory.

After determining the anticipated lateral vectoring trajectory for the aircraft and the corresponding reference vertical trajectory for that anticipated lateral vectoring trajectory, the energy management display process 200 calculates or otherwise determines a target value for an energy state parameter at the current location of the aircraft according to the reference vertical trajectory and generates or otherwise provides one or more graphical indicia influenced by the target value (tasks 212, 214). In exemplary embodiments, the energy management display process 200 identifies the target altitude defined by the reference vertical trajectory at the current aircraft location (e.g., based on the current distance from the airport along the lateral vectoring trajectory) and provides a graphical indication of the difference between the target altitude and the current (or real-time) altitude of the aircraft. For example, the processing system 108 may provide a graphical representation of the difference between the current altitude and the target altitude for the current aircraft location. Similarly, the processing system 108 may identify a target airspeed defined by the reference vertical trajectory at the current aircraft location and provide a graphical representation of the difference between the current airspeed and the target airspeed.

In one or more embodiments, the processing system 108 also identifies or otherwise determines one or more recommended actions to reduce the difference between the current energy state parameter value and the target energy state parameter value. For example, when the current airspeed is greater than the target airspeed by more than a threshold amount, the processing system 108 may provide a graphical indication to the pilot that the speed brakes or air brakes should be applied to reduce the speed of the aircraft 102. Conversely, when the current airspeed is less than the target airspeed by more than the threshold amount, the processing system 108 may provide a graphical indication to the pilot that thrust should be applied to increase the speed of the aircraft 102.

Figure 5:
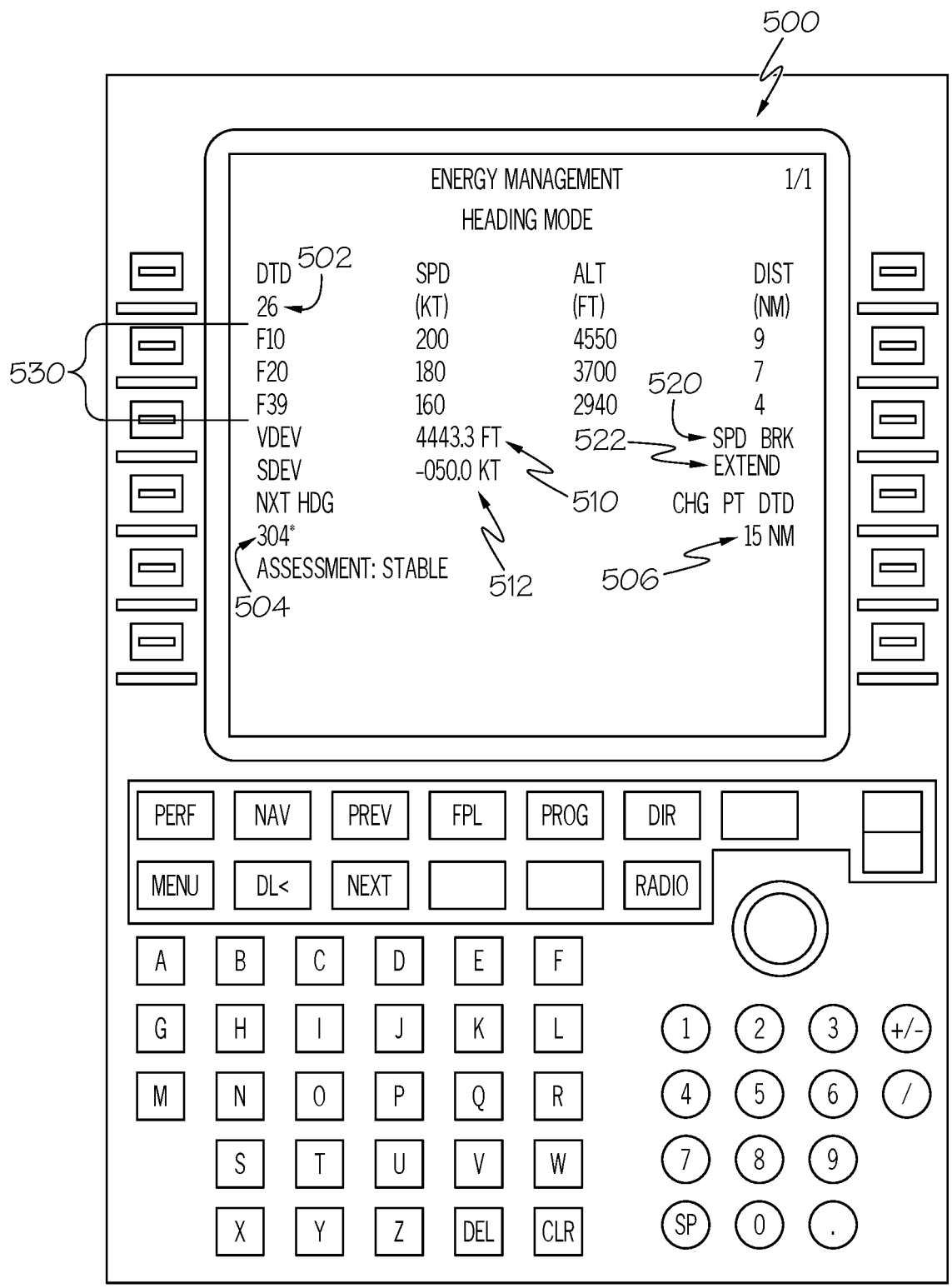
FIG. 5 depicts an exemplary radar vectoring guidance graphical user interface (GUI) display suitable for presentation on a display device in the aircraft system of FIG. 1 in conjunction with the energy management display process of FIG. 2 in accordance with one or more embodiments.

FIG. 5 depicts an exemplary radar vectoring graphical user interface (GUI) display 500 that may be presented on a display device 104 onboard an aircraft 102 in connection with the energy management display process 200 of FIG. 2. The radar vectoring GUI display 500 includes a graphical representation 502 of the lateral distance corresponding to the anticipated lateral vectoring trajectory 300 for the aircraft 102, 302 en route to the runway 304 along with a graphical representation 504 of the anticipated next heading to be assigned by the ATC (e.g., the heading associated with the next segment 312 following the current segment 310) when vectoring to the runway 304 and a graphical representation 506 of the relative location of (or the relative distance to) the transition point. In the depicted example, based on the current distance to destination 502 of 26 nautical miles and an anticipated distance to destination of 15 nautical miles at the next transition point, the pilot may estimate or otherwise ascertain the anticipated amount of distance (e.g., distance 322) or flight duration until the next radar vector heading is expected to be received from the ATC, thereby improving the pilot's situational awareness with respect to the lateral operation of the aircraft.

Additionally, the radar vectoring GUI display 500 includes a graphical indication 510 of the difference between the current aircraft altitude and the target aircraft altitude at the current distance to destination along the lateral vectoring trajectory along with a graphical indication 512 of the difference between the current speed of the aircraft and the target aircraft speed at the current distance to destination along the lateral vectoring trajectory, thereby improving the pilot's situational awareness with respect to the energy state of the aircraft 102. The radar vectoring GUI display 500 also includes graphical indicia 520, 522 of recommended actions for adjusting the current energy state of the aircraft 102 to reduce the difference between the current energy state and the target energy state according to the reference vertical trajectory. For example, the illustrated radar vectoring GUI display 500 includes a graphical indication 520 to apply the speed brake and a graphical indication 522 to extend the flaps. In this manner, the radar vectoring GUI display 500 provides guidance to facilitate the pilot managing the energy state of the aircraft to reduce the likelihood of a missed approach or go-around, increase the likelihood of a stable approach, and/or the like. In this regard, the graphical indicia 520, 522 of recommended actions may correspond to the recommended vertical trajectory 420 given the current deviation between the current aircraft energy state and the reference aircraft energy state according to the reference vertical trajectory 400.

In the illustrated embodiment, the radar vectoring GUI display 500 also includes graphical indicia 530 of the anticipated or recommended aircraft configuration changes according to the reference vertical trajectory. In this regard, the radar vectoring GUI display 500 provides indication of the relative lateral locations and corresponding altitudes and airspeeds at which the reference vertical trajectory anticipates, predicts, or otherwise recommends extending the flaps or making other configuration changes given the currently anticipated lateral vectoring trajectory, thereby improving the pilot's situational awareness with respect to upcoming configuration changes while radar vectoring.

Referring again to FIG. 2, in exemplary embodiments, the loop defined by tasks 206, 208, 210, 212 and 214 repeats throughout operation of the aircraft while radar vectoring to dynamically update the predicted trajectories as the aircraft travels. In this regard, when the ATC deviates from the original prediction by assigning a different subsequent heading and/or assigning the next heading at a different location than was previously predicted, the predicted lateral vectoring trajectory and corresponding reference vertical trajectory are dynamically updated to better reflect the behavior of the ATC and facilitate the pilot maintaining situational awareness with respect to the aircraft energy state as the ATC behavior varies from what was anticipated. Accordingly, the graphical indicia 502, 504, 506, 510, 512, 520, 522, 530 provided on the radar vectoring GUI display 500 may be dynamically updated as the aircraft energy state changes or the ATC behavior changes. Thus, the pilot's situational awareness and ability to manage the energy state of the aircraft while executing a radar vectored approach is improved.

It should be noted that in various embodiments, graphical representations of the predicted lateral vectoring trajectory and/or the corresponding reference vertical trajectory may be displayed or otherwise provided on a display device 104 onboard the aircraft 102 in connection with the energy management display process 200. For example, the predicted lateral vectoring trajectory 300 shown in FIG. 3 could be rendered or otherwise displayed on a lateral map display or other navigational display to provide the pilot with additional situational awareness or guidance with respect to the lateral route upon which it is anticipated the aircraft 102 while be radar vectored by ATC. Likewise, the reference vertical trajectory 400 shown in FIG. 4 could be rendered or otherwise displayed on a vertical profile display, a vertical situation display, or the like to provide the pilot with additional situational awareness or guidance with respect to the current vertical situation and energy state of the aircraft.

Dynamic Energy Management Guidance

Figure 6:
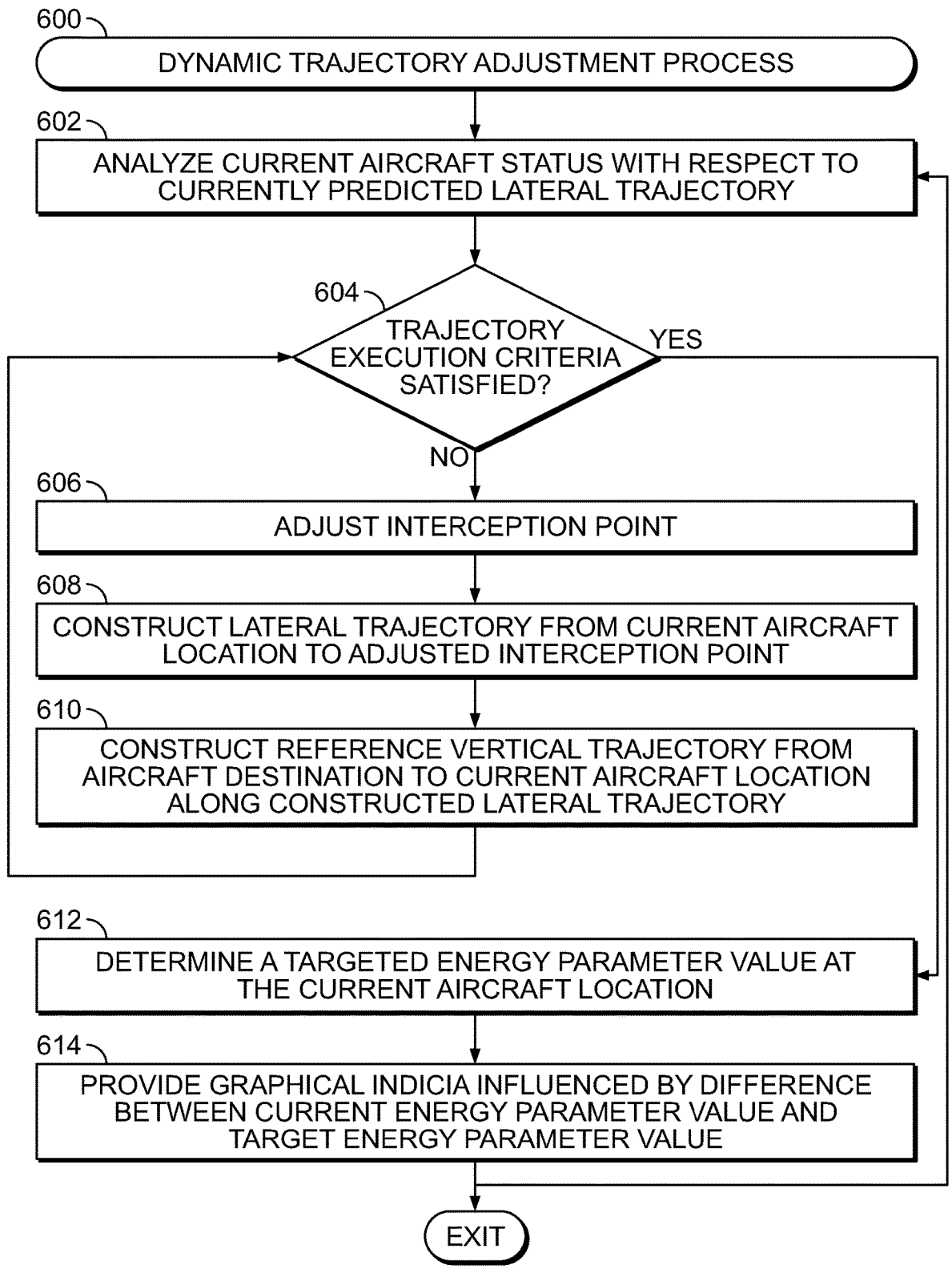
FIG. 6 is a flow diagram of an exemplary dynamic trajectory adjustment process suitable for use with the aircraft in the system of FIG. 1 in accordance with one or more embodiments.

Referring to FIG. 6, in exemplary embodiments, the aircraft system 100 is configured to support a dynamic trajectory adjustment process 600 to dynamically update the stable approach guidance for a radar vectored aircraft and perform additional tasks, functions, and operations described below. The various tasks performed in connection with the illustrated process 600 may be implemented using hardware, firmware, software executed by processing circuitry, or any combination thereof. For illustrative purposes, the following description may refer to elements mentioned above in connection with FIG. 1. In practice, portions of the dynamic trajectory adjustment process 600 may be performed by different elements of the system 100; however, for purposes of explanation, the dynamic trajectory adjustment process 600 may be described herein in the context of being primarily performed by the processing system 108. It should be appreciated that the dynamic trajectory adjustment process 600 may include any number of additional or alternative tasks, the tasks need not be performed in the illustrated order and/or the tasks may be performed concurrently, and/or the dynamic trajectory adjustment process 600 may be incorporated into a more comprehensive procedure or process having additional functionality not described in detail herein. Moreover, one or more of the tasks shown and described in the context of FIG. 6 could be omitted from a practical embodiment of the dynamic trajectory adjustment process 600 as long as the intended overall functionality remains intact.

In exemplary embodiments, the dynamic trajectory adjustment process 600 continually obtains and analyzes the current status information pertaining to the aircraft to detect or otherwise identify when one or more trajectory execution criteria are violated with respect to a previously-predicted lateral vectoring trajectory and/or the reference vertical trajectory for the aircraft (tasks 602, 604). For example, during operation of the aircraft, situations may arise where the ATC fails to provide the expected heading assignment as originally expected in accordance with the original (or previously predicted) lateral vectoring trajectory, or the difference (or deviation) between the current or real-time value for an energy state parameter and the target value dictated by the original reference vertical trajectory compromises the ability of the aircraft to satisfy the applicable stabilization or energy management criteria using the predicted lateral vectoring trajectory. Thus, in exemplary embodiments, when one or more trajectory execution criteria associated with flying the originally-predicted lateral vectoring trajectory and corresponding reference vertical trajectory is violated, a dynamic trajectory adjustment process 600 is performed to dynamically determine an updated adjusted lateral vectoring trajectory and an updated reference vertical trajectory. The updated adjusted lateral vectoring trajectory and updated reference vertical trajectory may be optimized according to the current state of the aircraft to satisfy the trajectory execution criteria. In this regard, the processing system 108 continually analyzes the current aircraft status (e.g., the current aircraft location, the current aircraft altitude, the current aircraft speed, and the like) with respect to the originally predicted lateral vectoring trajectory and reference vertical trajectory determined in accordance with the energy management display process 200 of FIG. 2 in real-time to detect or otherwise identify when the current aircraft status is indicative of one or more trajectory execution criteria being violated with respect to flying the originally predicted lateral vectoring trajectory and reference vertical trajectory.

In exemplary embodiments, the trajectory execution criteria includes one or more stabilization criteria to be satisfied by the aircraft when executing an approach, such that the dynamic trajectory adjustment process 600 is performed when the current altitude, speed, and/or other energy state parameter values for the aircraft result in the aircraft being unable to satisfy at least one of the applicable stabilization or energy management criteria using the predicted lateral vectoring trajectory. For example, the processing system 108 may determine that the current aircraft status violates one or more trajectory execution criteria for executing the originally predicted lateral vectoring trajectory and reference vertical trajectory and initiate the dynamic trajectory adjustment process 600 when current aircraft altitude is above the reference vertical trajectory and the processing system 108 is unable to identify recommended actions capable of reducing the current airspeed and/or altitude of the aircraft to intercept the reference vertical trajectory and satisfy a constant approach speed at an approach stabilization altitude (e.g., 1000 AGL), the altitude, airspeed, and/or descent rate criteria associated with the final approach fix, and/or other stabilization criteria (e.g., a specific aircraft configuration, a minimum and/or maximum descent rate, and/or the like) associated with other navigational reference points (e.g., the merge point, the initial approach fix (IAF), 500 foot AGL location for visual meteorological conditions, 300 foot AGL location for circle to land approach, etc.) of the predicted lateral vectoring trajectory.

Additionally, the trajectory execution criteria may include one or more operational criteria that are configured to constrain or otherwise limit the maneuverability of the aircraft to achieve one or more objectives (e.g., passenger comfort, safety, and/or the like). For example, the operational criteria may include a maximum roll (or bank angle) for the aircraft, a minimum turning radius, a maximum turning radius (e.g., to limit or constrain overshooting or crossing the runway axis), a maximum pitch angle for the aircraft, a maximum and/or minimum rate of descent or descent vectoring instruction (e.g., for maintaining vertical separation between other potential aircraft), and/or the like for intercepting the originally predicted lateral vectoring trajectory and/or reference vertical trajectory. In this regard, in some embodiments, the operational criteria may include or otherwise correspond to the maximum or minimum angles between headings of successive segments of the trajectory, the minimum segment length, and/or other criteria utilized by the energy management display process 200 to construct the intermediate segments that provide a feasible lateral vectoring trajectory. Thus, once the current aircraft status requires the aircraft violate one or more operational criteria to intercept the next segment of the originally predicted lateral vectoring trajectory and/or vertical trajectory, the lateral and vertical trajectories may be updated to provide a more feasible trajectory for the current aircraft state.

The processing system 108 continually analyzes the current aircraft status with respect to the originally predicted lateral vectoring trajectory and reference vertical trajectory to identify or otherwise detect when one or more operational criteria are violated when the deviation from the originally predicted lateral vectoring trajectory and/or reference vertical trajectory would result in the aircraft violating one or more operational criteria to recapture the originally predicted lateral vectoring trajectory and/or reference vertical trajectory. For example, if the ATC instruction is delayed and the ATC does not provide the expected heading assignment, as the aircraft continues along the previously assigned heading past the transition point where the aircraft was expected to be vectored from the currently assigned heading, the processing system 108 may detect or otherwise identify when the current aircraft location indicates the aircraft has passed the transition point by a distance that would result in the aircraft exceeding the maximum roll (or bank angle) criterion or would otherwise require too tight of a turning radius to be comfortably or safely executed. In this regard, when the processing system 108 detects the current aircraft status results in the aircraft violating an operational criterion to recapture the originally predicted lateral vectoring trajectory and/or reference vertical trajectory, the processing system 108 initiates the dynamic trajectory adjustment process 600 to update the predicted lateral vectoring trajectory and/or reference vertical trajectory to account for the current aircraft status.

When the dynamic trajectory adjustment process 600 detects the current aircraft status results in violating one or more trajectory execution criteria, the dynamic trajectory adjustment process 600 adjusts the location of the interception point relative to the final approach fix and constructs or otherwise generates an updated lateral vectoring trajectory for the aircraft from the current aircraft location and heading to the adjusted interception point in accordance with the interception criteria (tasks 606, 608). In one or more exemplary embodiments, the interception point is adjusted by increasing the distance in advance of the final approach fix that defines the location of the interception point by a fixed incremental amount (e.g., 1 nautical mile). In other embodiments, the incremental distance may be dynamic or variable and determined as a function of the aircraft speed to ensure the resulting distance for each incremental segment corresponds to the same minimum duration of time (e.g., 30 seconds) for flying that incremental distance.

In a similar manner as described above (e.g., task 208), the updated lateral vectoring trajectory is constructed that includes an adjusted initial segment aligned with the current aircraft heading and an adjusted final segment aligned with the runway heading, along with an interception segment that intersects or otherwise meets the final segment at the adjusted interception point. In this regard, increasing the distance in advance of the final approach fix between the interception point and the final approach fix increases the distance (or length) associated with the final segment. As described above, the interception segment is projected from the adjusted interception point along the interception angle or heading relative to the final segment towards the initial segment until intersecting the initial segment, and based on the resulting angle between the interception segment and the initial segment, one or more intermediate segments may be constructed between the adjusted initial segment and the interception segment. The resulting updated lateral vectoring trajectory satisfies the route construction rules or criteria that dictate the number and manner of constructing intermediate segments (e.g., minimum segment distance, a maximum angle between headings of successive segments, etc.) and accounts for the aircraft's current location, current airspeed, the current aircraft configuration, and potentially other factors (e.g., meteorological conditions or the like) to provide a feasible lateral vectoring trajectory that the aircraft 102 is capable of flying given the current aircraft status.

After constructing an updated lateral vectoring trajectory in accordance with the interception criteria using the adjusted interception point, the dynamic trajectory adjustment process 600 continues by constructing or otherwise generating a reference vertical trajectory corresponding to the updated lateral vectoring trajectory (task 610). As described above (e.g., task 210), in exemplary embodiments, the dynamic trajectory adjustment process 600 retrieves or otherwise obtains any altitude, airspeed, or other criteria or constraints associated with the final approach fix for the runway and then calculates the reference vertical trajectory backwards from the runway in a manner that complies with the applicable criteria. For example, the processing system 108 may identify a glideslope angle and/or other parameters or criteria associated with the runway for defining the approach flight path for landing at the runway, and then construct a vertical profile or flight path backwards from the final approach fix along the updated final segment between the final approach fix and the adjusted interception point. In exemplary embodiments, the backwards construction continues from the adjusted interception point along the updated lateral vectoring trajectory until reaching the current altitude of the aircraft. The updated vertical trajectory may also be configured to achieve a desired flight path angle for descending to the airport, a desired descent rate, a desired thrust configuration for descent (e.g., idle descent), desired flap extension points or other aircraft configuration change points relative to the airport while accounting for meteorological impacts on the descent of the aircraft 102 (e.g., wind speed and direction, etc.). In some embodiments, the updated vertical trajectory is constructed utilizing stabilization targets for different stabilization points such that the resulting altitudes and speeds for the aircraft along the updated lateral vectoring trajectory facilitate a stable approach and landing.

After constructing updated lateral and vertical trajectories using an adjusted interception point, the dynamic trajectory adjustment process 600 verifies or otherwise confirms that the resulting trajectories satisfy the trajectory execution criteria given the current aircraft status (task 604). In this regard, when the updated lateral and vertical trajectories fail to satisfy a stabilization criterion, an operational criterion, or another trajectory execution criterion, the dynamic trajectory adjustment process 600 iteratively adjusts the interception point and updates the lateral and vertical trajectories until arriving at an adjusted interception point that results in an updated prediction for the lateral vectoring trajectory and the corresponding reference vertical trajectory that satisfies the trajectory execution criteria (tasks 606, 608, 610).

For example, in some embodiments, the dynamic trajectory adjustment process 600 may first backwards construct an updated reference vertical trajectory from the runway or final approach fix using a published glide slope intercept altitude, the glide slope angle for the runway, and other stabilization criteria (e.g., task 610), and thereafter utilize the current aircraft status to calculate or otherwise determine whether a sequence and combination of aircraft configuration changes are capable of achieving a stable approach that intercepts the reference vertical trajectory at or before reaching the final approach fix or other stabilization point (e.g., task 604). For example, as described above, based on the current aircraft altitude and airspeed at the current aircraft location, in exemplary embodiments, the dynamic trajectory adjustment process 600 calculates or otherwise determines a recommended vertical trajectory for intercepting the updated reference vertical trajectory at or before an applicable altitude criterion or constraint. In this regard, the recommended vertical trajectory may be configured to have a constant descent flight path angle backwards from the location of a stabilization point (e.g., the 1000 ft AGL stabilization altitude, the glide slope intercept altitude, or the like), and the recommended vertical trajectory may be associated with a sequence of aircraft configuration changes (e.g., flap extension locations and extension positions, locations or distances for engaging the airbrake, and/or the like) to reduce the energy of the aircraft to intercept the updated reference vertical trajectory and satisfy the stabilization criteria (e.g., a constant approach speed at the location of the 1000 ft AGL stabilization altitude) based on the current aircraft altitude and airspeed.

When the dynamic trajectory adjustment process 600 is unable to identify a recommended vertical trajectory or stable approach scenario capable of intercepting the reference vertical trajectory and satisfying stabilization criteria given the current aircraft status, the dynamic trajectory adjustment process 600 may iteratively increase the distance between the interception point and the final approach fix and repeat the loop defined by tasks 604, 606, 608 and 610 until arriving at an updated lateral vectoring trajectory having an associated updated reference vertical trajectory capable of achieving a stable approach to the runway. In one or more embodiments, the processing system 108 iteratively increases the distance between the interception point and the final approach fix by a fixed incremental distance (e.g., 1 nautical mile) and dynamically determines updated lateral and vertical trajectories for each iteration until the resulting combination of the adjusted interception point and the updated lateral vectoring trajectory utilizing the adjusted interception point results in a corresponding vertical trajectory that satisfies the stabilization criteria associated with the runway while also complying with applicable operational criteria. In some embodiments, the processing system 108 iteratively increases the distance between the interception point and the final approach fix by a variable incremental distance. For example, as described above, a variable incremental distance may be calculated or otherwise determined as a function of the expected or predicted speed of the aircraft at the interception point to achieve a fixed incremental duration of flight (e.g., 30 seconds) added in advance of the final approach fix for each iteration to thereby facilitate minimizing the amount of added flight time to the trajectory and reducing potential delay in aircraft arrival time.

After arriving at updated lateral and vertical trajectories using the adjusted interception point, the dynamic trajectory adjustment process 600 utilizes the updated trajectories to calculate or otherwise determine one or more targeted energy parameter values for the current aircraft location using the updated trajectories and providing graphical indicia influenced by the difference between the current energy parameter value(s) for the aircraft and the targeted energy parameter value(s) (tasks 612, 614). In a similar manner as described above in the context of FIGS. 2 and 5, dynamic trajectory adjustment process 600 identifies the target altitude defined by the updated reference vertical trajectory at the current aircraft location (e.g., based on the current distance from the airport along the updated lateral vectoring trajectory) and provides a graphical indication of the difference between the target altitude and the current (or real-time) altitude of the aircraft. Similarly, the processing system 108 may identify a target airspeed defined by the updated reference vertical trajectory at the current aircraft location and provide a graphical representation of the difference between the current airspeed and the target airspeed. The processing system 108 may also identify or otherwise determine one or more recommended actions to reduce the difference between the current energy state parameter value and the target energy state parameter value. For example, as described above in the context of FIG. 5, the recommended actions may correspond to the recommended vertical trajectory for intercepting the updated reference vertical trajectory given the current deviation between the current aircraft energy state and the reference aircraft energy state according to the reference vertical trajectory. In some embodiments, the processing system 108 calculates or otherwise determines a stable approach scenario that intercepts the reference vertical trajectory and provides graphical indicia of aircraft configuration changes in accordance with the stable approach scenario. For example, the processing system 108 may provide graphical indicia of drag configuration changes for reducing the current aircraft energy while flying the updated lateral vectoring trajectories. In this manner, the likelihood of an unstable approach or a hard landing may be reduced while radar vectoring. As described above, the radar vectoring GUI display may also include graphical indicia of the anticipated or recommended aircraft configuration changes according to the recommended vertical trajectory to provide indication of the relative lateral locations and corresponding altitudes and airspeeds at which the recommended vertical trajectory anticipates, predicts, or otherwise recommends extending the flaps or making other configuration changes given the currently anticipated lateral vectoring trajectory, thereby improving the pilot's situational awareness with respect to upcoming configuration changes while radar vectoring.

Figure 7:
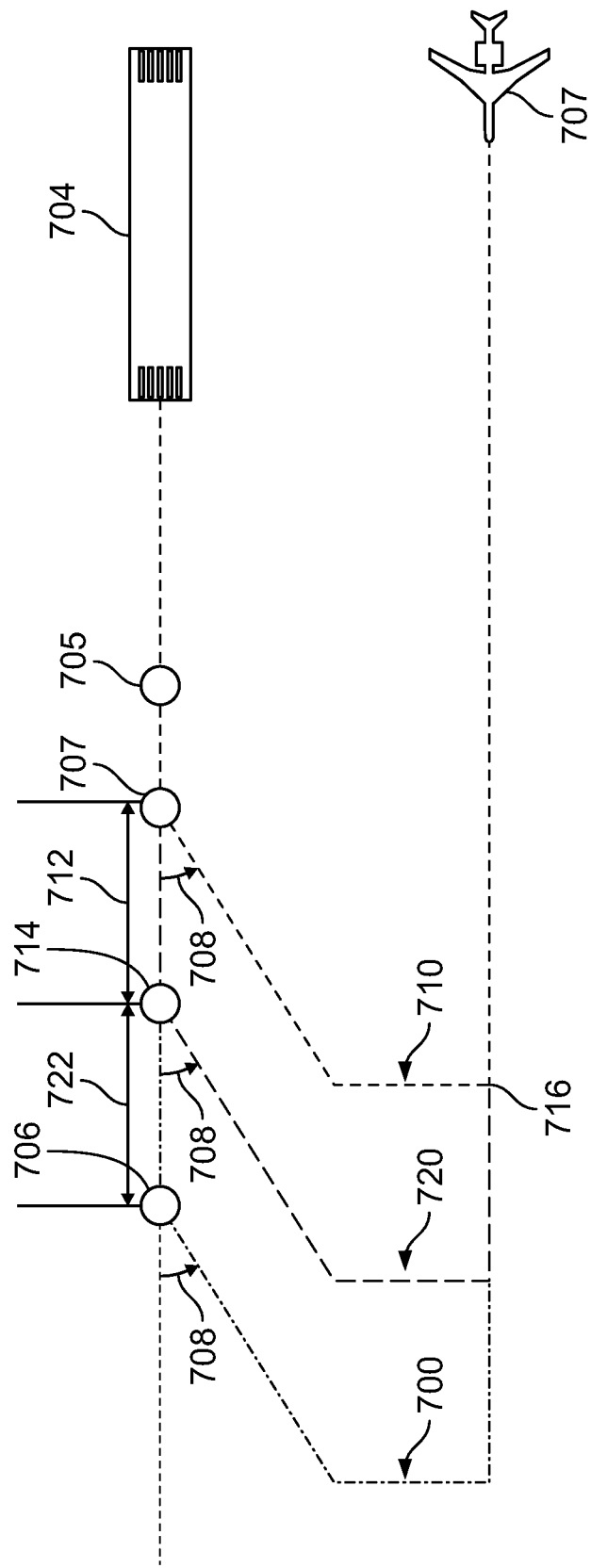
FIG. 7 depicts exemplary updated predicted lateral trajectories that may be constructed in connection with the dynamic trajectory adjustment process of FIG. 6 in accordance with one or more embodiments.

FIG. 7 depicts an exemplary updated lateral vectoring trajectory 700 that may be constructed in accordance with the dynamic trajectory adjustment process 600 for radar vectoring from a current location of an aircraft 702 to a desired runway 704. The lateral vectoring trajectory 700 intersects or intercepts the runway heading at the desired interception angle 708 relative to the runway heading at an adjusted interception point 706 in advance of the FAF 705 relative to an initial (or default) interception point 707 defined by an interception distance criterion. FIG. 7 depicts a scenario where the current altitude, speed, and/or other energy state parameter value for the aircraft at the current aircraft location 702 results in the aircraft being unable to satisfy a stabilization criteria for landing at the runway 704 using an originally predicted lateral vectoring trajectory 710 configured to intercept the runway heading the initial interception point 707 at the desired interception angle 708. For example, the originally predicted lateral vectoring trajectory 710 may have been initially generated when vectoring was first initiated by the ATC, where the ATC vectored the aircraft by specifying a heading to be flown along with an altitude and/or a speed to maintain along that heading. As the aircraft travels along the previously assigned heading with the specified altitude and/or speed, the current energy state of the aircraft with respect to the vertical reference trajectory associated with the originally predicted lateral vectoring trajectory 710 may eventually deviate by an amount that reduces the likelihood of the aircraft being able to satisfy stabilization criteria for the runway 704 and/or FAF 705 if the originally predicted lateral vectoring trajectory 710 is flown. When the processing system 108 is unable to identify a recommended vertical trajectory (e.g., recommended vertical trajectory 420) from the current aircraft altitude at the current aircraft location that is capable of intercepting the reference vertical trajectory (e.g., reference vertical trajectory 400) and satisfying applicable stabilization criteria in advance of the FAF 705 (e.g., stabilization altitude criterion 406, stabilization criteria associated with the FAF 705, and/or the like) based on the current aircraft speed and potentially other current energy state parameter values (e.g., tasks 602, 604), the processing system 108 dynamically determines an updated lateral vectoring trajectory in accordance with the dynamic trajectory adjustment process 600. In this regard, the processing system 108 iteratively increases the distance between the runway interception point and the FAF 705 until arriving at an adjusted lateral vectoring trajectory for which the processing system 108 can identify a recommended vertical trajectory from the current aircraft altitude at the current aircraft location that is capable of intercepting a reference vertical trajectory corresponding to the adjusted lateral vectoring trajectory in advance of the FAF 705 and satisfying applicable stabilization criteria (e.g., tasks 606, 608, 610).

In response to detecting that the current aircraft status results in the aircraft being unable to satisfy a stabilization criterion for landing at the runway 704, the dynamic trajectory adjustment process 600 adjusts the interception point 707 by an incremental distance 712 to increase the length of the final segment in advance of the final approach fix 705 to obtain an adjusted interception point 714 (e.g., task 606). The dynamic trajectory adjustment process 600 determines an updated lateral vectoring trajectory 720 for intercepting the runway heading at the adjusted interception point 714 at the desired interception angle 708 (e.g., task 608) and determines an updated reference vertical trajectory corresponding to the updated lateral vectoring trajectory 720 (e.g., task 610). The dynamic trajectory adjustment process 600 then analyzes the current aircraft status with respect to the updated reference vertical trajectory corresponding to the updated lateral vectoring trajectory 720 to determine whether the stabilization criteria for landing at the runway 704 can be satisfied. In this regard, when the processing system 108 is unable to identify a recommended vertical trajectory from the current aircraft altitude at the current aircraft location that is capable of intercepting the reference vertical trajectory corresponding to the updated lateral vectoring trajectory 720 and satisfying applicable stabilization criteria in advance of the FAF 705, the dynamic trajectory adjustment process 600 iteratively adjusts the interception point 714 by another fixed distance increment 722 to obtain the adjusted interception point 706, and thereby further increase the length of the final segment in advance of the final approach fix 705 (e.g., task 606). The dynamic trajectory adjustment process 600 determines an updated lateral vectoring trajectory 700 for intercepting the runway heading at the adjusted interception point 706 and determines an updated reference vertical trajectory corresponding to the updated lateral vectoring trajectory 700 (e.g., task 610).

Once the dynamic trajectory adjustment process 600 determines the aircraft is capable of satisfying the stabilization criteria for landing at the runway 704 (e.g., the glide slope intercept altitude, minimum and/or maximum altitude criteria for the FAF 705, etc.), the dynamic trajectory adjustment process 600 ceases iteratively adjusting the interception point and dynamically updates the radar vectoring GUI display to include graphical indicia corresponding to the updated lateral vectoring trajectory 700 in lieu of the originally predicted lateral vectoring trajectory 710. In this regard, when the processing system 108 is capable of identifying a sequence of aircraft drag configuration changes for reducing the energy of the aircraft to intercept the updated reference vertical trajectory and satisfy the stabilization criteria based on the current aircraft altitude and airspeed, the processing system 108 determines the adjusted updated lateral vectoring trajectory is capable of satisfying the stabilization criteria (e.g., task 604) and generates graphical indicia using the adjusted updated lateral vectoring trajectory, the updated reference vertical trajectory, and/or the recommended vertical trajectory for intercepting the updated reference vertical trajectory (e.g., tasks 612, 614) in a similar manner as described above in the context of FIGS. 2 and 5 (e.g., tasks 212, 214).

For example, the processing system 108 may dynamically update the radar vectoring GUI display to include graphical indicia of the updated prediction of the lateral distance to go en route to the runway corresponding to the adjusted lateral vectoring trajectory 700, graphical indicia of the anticipated next heading to be assigned by the ATC according to the adjusted lateral vectoring trajectory 700, graphical indicia of the difference between the current aircraft altitude and the target aircraft altitude at the current distance to destination along the adjusted lateral vectoring trajectory 700, graphical indicia the difference between the current speed of the aircraft and the target aircraft speed at the current distance to destination along the adjusted lateral vectoring trajectory 700, and/or the like, thereby improving the pilot's situational awareness with respect to the dynamically changing energy state of the aircraft with respect to a dynamically changing situation while vectoring (e.g., when ATC behavior deviates from original predictions). As described above, the radar vectoring GUI display may also include graphical indicia of recommended aircraft configuration changes or other actions for adjusting the current energy state of the aircraft to reduce the difference between the current energy state and the target energy state at the current aircraft location and facilitate the pilot managing the energy state of the aircraft to reduce the likelihood of a missed approach or go-around, increase the likelihood of a stable approach, and/or the like. Thus, by dynamically adjusting the interception point to increase the total length of the predicted lateral vectoring trajectory, the dynamic trajectory adjustment process 600 provides opportunity for excess energy to be dissipated for achieving a stable approach and landing while still providing the pilot with guidance for how the aircraft is expected to be vectored by ATC given the current vectoring assignment and accounting for dynamic changes to the aircraft energy state or ATC behavior. In this regard, dynamically updating the trajectory during flight in the absence of an assigned vector from the ATC at or around the originally expected point of the originally predicted trajectory may operate as a cue to the pilot to initiate communications with the ATC to negotiate the approach and/or arrival while still providing interim guidance on how the pilot can manage aircraft energy in the absence of ATC instruction.

Still referring to FIG. 7, in other scenarios, where the ATC fails to provide the expected radar vectoring assignment corresponding to the initially predicted lateral vectoring trajectory 710 by the time the aircraft 702 reaches the initially predicted transition point 716, the dynamic trajectory adjustment process 600 may similarly adjust the interception point from the initial interception point 707 when the location aircraft passes the transition point 716 by an amount that would require the aircraft violate one or more operational criteria for safely and/or feasibly intercepting the initially predicted lateral vectoring trajectory 710. In this manner, the interception point may be adjusted away from the final approach fix 705 to achieve an updated lateral vectoring trajectory (e.g., lateral vectoring trajectory 720) that the aircraft is capable of flying without violating the operational criteria. When the dynamic trajectory adjustment process 600 determines the aircraft is capable of satisfying the operational criteria using an updated lateral vectoring trajectory, the dynamic trajectory adjustment process 600 dynamically updates the radar vectoring GUI display to include graphical indicia corresponding to the updated lateral vectoring trajectory (e.g., lateral vectoring trajectory 720) in lieu of the originally predicted lateral vectoring trajectory 710. In this manner, the dynamic trajectory adjustment process 600 accounts for potential delays in the ATC providing a heading assignment by providing the pilot with real-time guidance for how the aircraft is expected to be vectored by ATC that accounts for ATC delays.

For the sake of brevity, conventional techniques related to approach procedures, aerodynamics, aircraft modeling, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/ node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting energy management of an aircraft radar vectoring en route to an airport along a current heading, the method comprising:
   identifying a stabilization criterion associated with approaching a runway at the airport;
   iteratively determining a lateral vectoring trajectory and a vertical trajectory corresponding to the lateral vectoring trajectory that satisfies the stabilization criterion based at least in part on the current heading and a current location of the aircraft by iteratively adjusting a distance between a runway interception point and a final approach fix associated with the runway until satisfying the stabilization criterion;
   determining a target value for an energy state parameter of the aircraft at the current location on the lateral vectoring trajectory using the vertical trajectory; and
   providing guidance for managing an energy state of the aircraft comprising a graphical indication of a recommended action to reduce a difference between a current value for the energy state parameter of the aircraft and the target value.

2. The method of claim 1, wherein:
   determining the target value comprises determining a target altitude at the current location on the lateral vectoring trajectory according to the vertical trajectory; and
   providing the graphical indication comprises displaying the recommended action for reducing the difference between a current altitude of the aircraft and the target altitude.

3. The method of claim 1, wherein:
   determining the target value comprises determining a target speed at the current location on the lateral vectoring trajectory according to the vertical trajectory; and providing the graphical indication comprises displaying the recommended action for reducing the difference between a current speed of the aircraft and the target speed.

4. The method of claim 1, further comprising:
obtaining a current aircraft status; and
determining the current aircraft status violates a trajectory execution criterion with respect to a predicted lateral vectoring trajectory prior to iteratively determining the lateral vectoring trajectory and the vertical trajectory.

5. The method of claim 4, the trajectory execution criterion comprising the stabilization criterion, wherein determining the current aircraft status violates the trajectory execution criterion comprises determining the current aircraft status violates the stabilization criterion with respect to a previous reference vertical trajectory corresponding to the predicted lateral vectoring trajectory prior to iteratively determining the lateral vectoring trajectory and the vertical trajectory.

6. The method of claim 4, the trajectory execution criterion comprising an operational criterion, wherein determining the current aircraft status violates the trajectory execution criterion comprises determining the current aircraft status violates the operational criterion with respect to at least one of the predicted lateral vectoring trajectory and a previous reference vertical trajectory corresponding to the predicted lateral vectoring trajectory prior to iteratively determining the lateral vectoring trajectory and the vertical trajectory.

7. The method of claim 4, wherein:
the lateral vectoring trajectory comprises an updated lateral vectoring trajectory; and
a first lateral distance associated with the updated lateral vectoring trajectory is greater than a second lateral distance associated with the predicted lateral vectoring trajectory.

8. The method of claim 1, further comprising:
identifying a transition point for a future heading assignment based on the lateral vectoring trajectory; and
providing graphical indicia of at least one of the transition point and the future heading assignment.

9. The method of claim 1, wherein iteratively adjusting the distance comprises incrementally increasing the distance between the runway interception point and the final approach fix until the aircraft is capable of satisfying the stabilization criterion.

10. The method of claim 1, wherein iteratively adjusting the distance comprises iteratively adjusting the distance until a recommended vertical trajectory for intercepting a reference vertical trajectory corresponding to the lateral vectoring trajectory from a current altitude of the aircraft at the current location of the aircraft satisfies the stabilization criterion at or before the final approach fix.

11. The method of claim 10, wherein:
the stabilization criterion comprises an altitude criterion for the final approach fix;
the lateral vectoring trajectory comprises a sequence of navigational segments between the current location of the aircraft and the final approach fix;
each navigational segment of the sequence of navigational segments is associated with an anticipated aircraft heading and a respective distance for the respective navigational segment;
the sequence of navigational segments includes a segment aligned with the runway corresponding to the distance between the runway interception point and the final approach fix;

the reference vertical trajectory comprises a vertical flight path for the lateral vectoring trajectory that satisfies the altitude criterion at the final approach fix; and
the recommended vertical trajectory comprises a sequence of aircraft configuration changes for intercepting the reference vertical trajectory from the current altitude of the aircraft at or before the final approach fix.

12. The method of claim 10, wherein:
the stabilization criterion comprises a speed criterion for the final approach fix;
the lateral vectoring trajectory comprises a sequence of navigational segments between the current location of the aircraft and the final approach fix;
each navigational segment of the sequence of navigational segments is associated with an anticipated aircraft heading and a respective distance for the respective navigational segment;
the sequence of navigational segments includes a segment aligned with the runway corresponding to the distance between the runway interception point and the final approach fix;
the reference vertical trajectory comprises a vertical flight path for the lateral vectoring trajectory that satisfies the speed criterion at the final approach fix; and
the recommended vertical trajectory comprises a sequence of aircraft configuration changes for satisfying the speed criterion at the final approach fix and intercepting the reference vertical trajectory from the current altitude of the aircraft at or before the final approach fix.

13. A computer-readable medium having computer-executable instructions stored thereon that, when executed by a processing system, cause the processing system to:
obtain, from one or more systems onboard an aircraft, a current status of the aircraft;
compare the current status of the aircraft to a predicted lateral vectoring trajectory for the aircraft and a reference vertical trajectory for the predicted lateral vectoring trajectory;
when the current status of the aircraft violates a trajectory execution criterion with respect to the predicted lateral vectoring trajectory, dynamically determine an updated lateral vectoring trajectory and an updated reference vertical trajectory corresponding to the updated lateral vectoring trajectory that satisfies a stabilization criterion based at least in part on the current status of the aircraft, wherein:
the updated lateral vectoring trajectory comprises a sequence of segments from a current location of the aircraft to an airport;
each navigational segment of the sequence is associated with an anticipated aircraft heading and a respective distance for the respective navigational segment;
the sequence of segments includes a segment aligned with a runway at the airport from a runway interception point to a final approach fix associated with the runway; and
dynamically determining the updated lateral vectoring trajectory comprises iteratively adjusting a distance between the runway interception point and the final approach fix until the current status is capable of satisfying the stabilization criterion associated with the updated reference vertical trajectory;

determine a target value for an energy state parameter of the aircraft at the current location on the updated lateral vectoring trajectory using the updated reference vertical trajectory; and provide a graphical indication of a recommended action to reduce a difference between a current value for the energy state parameter of the aircraft and the target value.

14. The computer-readable medium of claim 13, wherein:
the current status comprises a current aircraft location and a current aircraft altitude;
the target value comprises a target altitude at the current aircraft location on the updated lateral vectoring trajectory according to the updated reference vertical trajectory; and
the recommended action is capable of reducing the difference between the current aircraft altitude and the target altitude.

15. The computer-readable medium of claim 13, wherein:
the current status comprises a current aircraft location and a current aircraft speed;
the target value comprises a target speed at the current aircraft location on the updated lateral vectoring trajectory according to the updated reference vertical trajectory; and
the recommended action is capable of reducing the difference between the current aircraft speed and the target speed.

16. The computer-readable medium of claim 13, the current status comprising a current aircraft altitude and a current aircraft speed at a current aircraft location, wherein the instructions cause the processing system to iteratively adjust the distance between the runway interception point and the final approach fix until identifying a stable approach between the current aircraft altitude at the current aircraft location and a stabilization point on the updated reference vertical trajectory based on the current aircraft altitude and the current aircraft speed.

17. The computer-readable medium of claim 16, wherein the stable approach comprises a sequence of aircraft configuration changes for intercepting the updated reference vertical trajectory from the current aircraft altitude at the current aircraft location along the updated lateral vectoring trajectory.

18. The computer-readable medium of claim 13, wherein the instructions cause the processing system to:

identify a transition point for a future heading assignment based on the updated lateral vectoring trajectory; and
provide graphical indicia of at least one of the transition point and the future heading assignment.

19. An aircraft system comprising:
a display device;
a data storage element to maintain interception criteria;
a navigation system to provide a current location of an aircraft radar vectoring en route to an airport and a current heading of the aircraft; and
a processing system coupled to the display device, the data storage element and the navigation system to:
determine a lateral trajectory to a runway at the airport in accordance with the interception criteria based at least in part on the current heading;
identify when a current aircraft status violates a trajectory execution criterion for the lateral trajectory;
when the current aircraft status violates the trajectory execution criterion, dynamically determine an updated lateral trajectory to the runway for satisfying the trajectory execution criterion using the interception criteria based at least in part on the current heading and the current location of the aircraft by iteratively adjusting a runway interception point until satisfying the trajectory execution criterion;
determine a vertical trajectory corresponding to the updated lateral trajectory using one or more criteria associated with the runway;
determine a target value for an energy state parameter of the aircraft at the current location on the updated lateral trajectory; and
provide, on the display device guidance for managing an energy state of the aircraft comprising, a graphical indication of a recommended action influenced by a difference between a current value for the energy state parameter of the aircraft and the target value.

20. The aircraft system of claim 19, wherein:
the updated lateral trajectory comprises a sequence of segments for satisfying the interception criteria from the current location of the aircraft;
each navigational segment of the sequence is associated with an anticipated aircraft heading and a respective distance for the respective navigational segment; and
the sequence of segments includes a segment aligned with the runway from the runway interception point to a final approach fix associated with the runway.

* * * * *